July 12, 1966  R. R. ROEMER  3,260,499
HIGH PRESSURE CONTROL VALVE
Filed May 31, 1963  2 Sheets-Sheet 1

INVENTOR.
Ralph R. Roemer,
BY John H. Sincord,
his ATTORNEY.

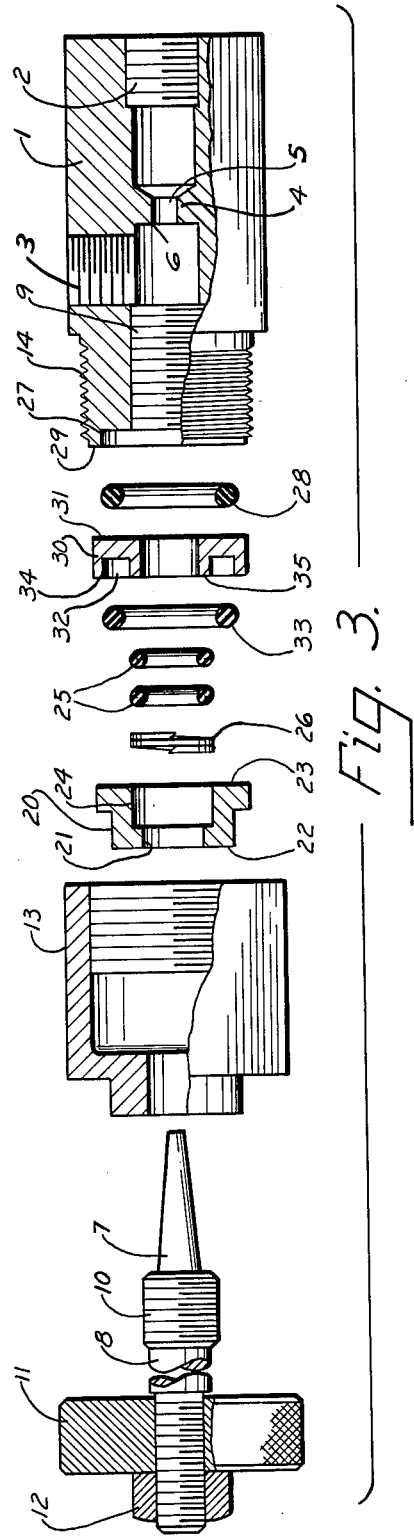

3,260,499
HIGH PRESSURE CONTROL VALVE
Ralph R. Roemer, 2100 Vega Ave., Cleveland, Ohio
Filed May 31, 1963, Ser. No. 284,477
12 Claims. (Cl. 251—214)

This invention relates to a control valve for controlling the flow of fluids, and particularly to a fluid flow control valve which can be operated or set to completely stop the flow of fluids or opened different amounts to control the volume of flow, and more specifically to a needle valve for controlling the flow of high pressure fluids.

More particularly the invention relates to valves of this general type for use in connection with lines wherein the valve is subjected to very high pressures; for example, pressures up to 5000 pounds per square inch or more.

For the purposes of illustration, the invention will be described as applied to the hand manipulated or settable needle valve, its application to other valves being apparent from the illustrative example.

Heretofore, in needle valves employing moderately high pressures, difficulty has been experienced in preventing the escape of pressure fluid around the stem, or through the threads of the packing nut while the valve is open. However, by the use of simple O-rings between the packing nut and body, effective seals around the stem to prevent leakage therealong at high pressures can be obtained, but the problem of leakage through the threads remains.

In accordance with the present invention, a seal is provided which can prevent the escape of fluid from the body both around the stem and particularly through the threads while the valve is open, at pressures in the range of 5000 p.s.i. and higher.

Various other objects and advantages will become apparent from the following description wherein wherein reference is made to the drawings, in which:

FIG. 3 is a reduced exploded view showing the parts of the valve in alignment but unassembled.

Figure 1:
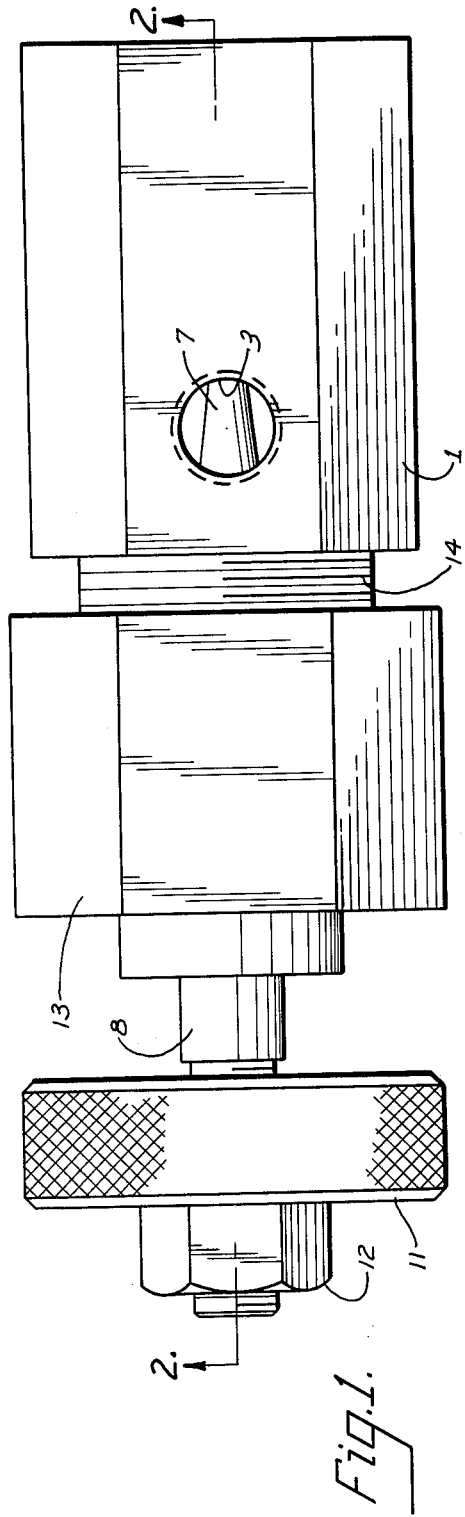
FIG. 1 is a front elevation of a valve embodying the principles of the prevent invention.
Figure 2:
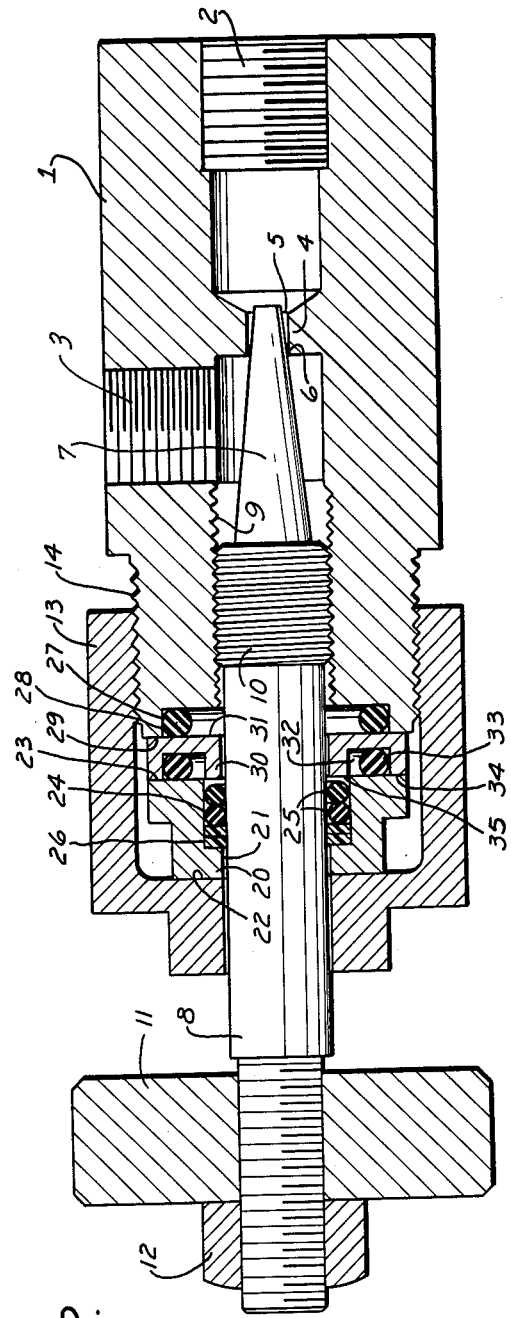
FIG. 2 is a vertical axial sectional view through the valve illustrated in FIG. 1 and is taken on the line 2—2 thereof.

Referring to the drawings, which illustrate a preferred embodiment of the invention as applied to a needle valve, the valve comprises a hollow body 1 having at one end an inlet 2 and an outlet 3 in communication with the body cavity, the inlet and outlet being threaded for connection to suitable pipe lines or equipment.

Within the body cavity between the inlet 2 and outlet 3 is a partition wall 4 having a passage therethrough communicating with the inlet and outlet and provided at one end of the passage with an annular seat 6 for cooperation with the valve plug 7.

In the form illustrated, the plug 7 is frusto-conical with its smaller base disposed in the passage 5.

In order to move the valve plug into and out of seating relation to the seat 6 and thus to open and close the valve and control the flow, a stem 8 is provided. The stem 8 is mounted in the body for movement axially thereof toward and away from the seat. The stem preferably is rigid with, and coaxial with the plug. Suitable means are provided for moving the stem axially. As illustrated, they may comprise an internally threaded bore 9 in the body coaxial with the seat 6, and an externally threaded portion 10 on the stem cooperable with the threads of the bore 9 for advancing and retracting the stem axially consequent upon rotation of the stem in opposite directions, respectively. The stem is provided at its outer end with a suitable handle 11 held in place by a nut 12. Other means may be used for operating the stem for controlling the valve means and thereby the flow through the valve.

The other end of the body is shown as being in the form of a suitable compression cap 13 which is arranged to be connected to the remainder of the body for adjustment in a direction axially of the stem. For this purpose the cap is internally threaded near its open end and is in threaded engagement with an externally threaded portion 14 on the body so that upon rotation of the cap it may be advanced axially of the body in a direction toward the seat or retracted therefrom.

As hereinbefore mentioned great difficulty is encountered when dealing with the pressures as high as 5000 p.s.i., to prevent the escape of pressure liquid or fluid between the threaded portions 9 of the bore and 10 of the valve, and thence along the stem into the cap from which latter space the liquid or fluid leaks out in the space between the stem and bore in the end wall of the cap and between the threads of the cap and portion 14 of the body. Heretofore, for this purpose, O-rings have been provided between the end wall of the cap and the body with a conventional synthetic organic plastic back-up ring interposed between the O-rings and the end wall of the cap so as not to subject the O-rings to frictional rubbing and stresses when the cap is screwed onto the body sufficiently to tighten the O-rings.

The characterizing part of the present invention is the means for providing a seal to prevent the escape of fluid along the peripheral wall of the stem and out through the end wall of the cap of the body and between the threads of the body and cap. For this purpose, the sealing means comprises an O-ring holder 20 having a central bore 21 through which the stem 8 extends and wherein it is accommodated with the usual slight operating clearance for both axial and rotative movement relative to the O-ring holder.

The holder has an outer end 22, an inner end 13, and a counterbore 24. The counterbore 24 is of larger diameter than the bore 21 and is open at the inner end 23 of the holder, thus facing in a direction generally toward the seat in the body cavity. A pair of O-rings 25, preferably identical with each other, are disposed in the counterbore 24 in coaxial relation therewith and endwise alignment with each other, with their adjacent ends juxtaposed. The O-rings 25 are in resilient engagement with the outer peripheral wall of the counterbore and the peripheral wall of the stem aligned therewith. Since the counterbore is open toward the body, fluid passing along the stem toward the outer end of the stem presses against the inner end of the one of the O-rings nearest the open end of the counterbore and builds up pressure for compressing both rings to effect a tight seal with the bore and stem walls. The usual plastic back-up ring 26 in axial alignment with the O-rings may be disposed in the counterbore between the end wall of the counterbore and the adjacent end of the adjacent O-ring 25. The ring 26 preferably is an organic synthetic plastic marketed as "Teflon."

The threaded portion 14 of the body has an internal counterbore 27 in which is accommodated an O-ring 28.

The portion of the body in which the counterbore 27 is provided terminates axially at the open end of the counterbore 27 in an annular end surface 29 facing toward the holder 20. Interposed between the holder 20 and the surface 29 is an intermediate member 30 in the form of a valve washer. The intermediate member has a central bore which fits the stem 8 with operating clearance so that the stem is rotatable and movable axially relative to the member. The member 30 is of sufficient outer diameter so that the outer peripheral margin 31 of its inner end face engages the surface 29 of the body and seats firmly thereon. Thus, in the operating position of the intermediate member 30, the O-ring 28 is pressed firmly between the end wall of the counterbore 27 and the inner end face of the member 30. The member 30 is provided at its outer end with an annular channel 32 spaced from its outer and inner peripheries and open at the outer end of the member 30 and facing the holder 20. An O-ring 33 is disposed in the annular channel 32, and when the holder and intermediate member are in operating position, the O-ring is compressed to a certain degree between the bottom wall of the channel 32 and the inner end face of the holder 20.

The member 30 has, at its outer end, an outer annular end surface margin 34 and an inner annular end surface margin 35. The inner end face of the holder 20 extends at a sufficient distance radially so that it engages the outer margin 34 of the intermediate member for exerting pressure thereagainst in a direction toward the surface 29 on the body.

When the cap 13 is screwed onto the body in a direction toward the seat, its inner end wall engages the annular end wall portion 22 of the holder 20 and exerts a pressure thereon in a direction toward the seat. The annular margin of the inner end of the holder engages the surface 34 which is of greater diameter than the outer diameter of the end wall 22. Correspondingly, the peripheral margin of the inner end face of the intermediate member engages the annular marginal surface 29 of the body which also is of greater external diameter than the external diameter of the surface 22 of the holder. Consequently, when the cap is rotated, there is less frictional drag between the surface 22 and the end wall of the cap 13 than between the holder and the intermediate member or the intermediate member and the body. Thus these surfaces operate as cooperable means to constrain the holder frictionally from rotation with the cap. This reduces the possible wear on the O-rings employed. Also, by engagement of the cap 13 with the end wall 22, and engagement of the inner end 23 with the margin 34, and the intermediate member 30 with the surface 29, the amount of compression of the O-rings is predetermined. The dimensions are preselected so that the compression is in accordance with O-ring engineering practices.

When the valve is closed, of course, there is no problem of leakage of fluid. However, when the valve is partially or fully open and the outlet is connected to apparatus wherein extremely high pressure is maintained in the valve body, the fluid seeks to flow past the seat through the adjacent part of the body and then in the space between the threaded portion 9 and the threads 10 on the stem. Passing the threaded portion 10 of the stem, it continues to creep along the stem until it reaches the O-rings 25 which prevent it from escaping and passing further along the stem toward the outer end of the stem. However, when the fluid is thus constrained by the O-rings 25 it tends to leak out of the body, including the cap portion thereof, between the threads of the cap and complementary threads 14 on the body. Any fluid tending to escape radially outwardly from the counterbore 27 applies outward pressure to the O-ring 28 which is already stressed between the bottom of the counterbore 27 and the inner end of the intermediate member. This pressure, of course, tends to force the O-ring more firmly into seating engagement with the end wall of the counterbore 27, the inner end of the intermediate member 30, and the peripheral wall. Thus no fluid can escape between the surface 29 and margin 31. However, this does not prevent the leakage or passage of fluid through the space between the outer periphery of the stem 8 and the wall of the central bore of the intermediate member 30. Such fluid passes along the stem and is constrained from further axial passage by the O-rings 25, as described. It can flow radially outwardly between the inner end of the holder 20 and the outer end of the intermediate member 30. In doing so, however, it builds up a pressure in the channel 32, thus further stressing the already stressed O-ring 33 to provide a seal between the inner end of the holder 20, the bottom wall of the channel 32, and the outer peripheral wall of the channel 32, thus providing an effective seal so that the fluid cannot escape radially outwardly into the inside of the cap 13. Generally the handle 11 is calibrated with circumferential row of indicia so that it is known how wide the needle valve is to be open for a given flow at a given pressure to which the valve is going to be subjected. This setting is usually made when the pump delivery pressure is reduced or stopped, as the binding of the O-rings 25 under extremely high pressure make it difficult to rotate the valve stem, and the rotation of the stem while the pressure is high would cause abrasion and damage to the O-rings 25.

When the valve is closed, it can, of course, be seated sufficiently tightly so that no pressure fluid escapes past the seat.

Having thus described my invention, I claim:

1. A sealing means for a hydraulic system which comprises a hollow body connectable internally to a source of fluid under high pressure and wherein a cylindrical actuator stem extends into the body from the exterior thereof and is movable axially relative to the body, and wherein the body has a wall coaxial with the stem and facing toward the outer end of the stem, said sealing means comprising:

an annular holder member adapted to be accommodated in the body in axially spaced relation to said wall in a direction toward said outer end of the stem and in surrounding relation to, and axially movable relation to, the stem;

an intermediate annular member coaxial with the holder member and adapted to be accommodated in the body between said wall and holder member in endwise contact at its opposite ends with the holder member and said wall, respectively;

a first O-ring at that face of the intermediate member which is opposite from the holder member, said first O-ring being adapted to lie between and in resilient sealing engagement with said intermediate member and a portion of said wall in radially outwardly spaced relation to, and axially movable relation to, the stem;

a second O-ring between and coaxial with the members and adapted to lie in radially outwardly spaced relation to the stem and to be in resilient sealing engagement with the members when the members are in endwise contact;

said holder member having at its inner end a bore which is coaxial with the members and of less diameter than the second O-ring and which has an end wall facing toward the intermediate member;

a third O-ring in the bore in engagement with the peripheral wall of the bore and adapted for resilient sealing engagement with the periphery of the stem;

and said holder member being adapted to have force exerted thereon by a retaining means on the body in a direction axially inwardly of the stem for retaining the holder member in endwise contact with the intermediate member and the intermediate member in contact with said wall for thereby retaining first and second O-rings in their respective resilient sealing engagements.

2. A sealing device to claim 1 wherein the body has a counterbore coaxial with the stem and opening toward the intermediate member, said wall portion is the end wall of the counterbore of the body, and the first mentioned O-ring is disposed in the counterbore between the end wall of the counterbore and the adjacent end of the intermediate member.

3. A sealing device according to claim 1 wherein one of said members has an annular channel opening toward the member and of greater diameter than the bore of the holder member, and the second O-ring is disposed in the channel between the bottom of the channel and the end of the member facing toward the channel.

4. A sealing device according to claim 3 wherein the channel is in the intermediate member.

5. A sealing device according to claim 4 wherein a portion of the intermediate annular member, between its central passage and the inner periphery of the channel, is aligned with and substantially blocks the open end of the bore of the holder member, when the members are in operative position, for retaining the O-ring in the bore of the holder member.

6. A sealing device according to claim 1 wherein back-up ring means are disposed in the bore of the holder member between the end wall of its bore and the O-ring in its bore.

7. A sealing device according to claim 1 wherein a back-up ring is disposed in the bore of the holder member between its end wall and its open end, and two O-rings aligned axially of the stem and in end to end juxtaposition are disposed in said bore of the holder between its open end and the back-up ring.

8. A sealing device according to claim 1 wherein the holder member and the intermediate member have their adjacent end faces in engagement with each other at their outer peripheral margins, and said margins are outwardly from the O-ring between the members.

9. A sealing device accoding to claim 1 wherein the retaining means is a cap in threaded engagement with the body with the threads coaxial with the stem, and the inner face of the closed end of the cap engages the adjacent end of the holder member for exerting said force, and cooperable means on the members and body constrain the holder member from rotation with the cap as the cap is tightened.

10. A sealing device according to claim 9 wherein the cooperable means comprise mutually engaging surfaces on the inner end of the holder member and intermediate member of greater diameter than the diameter of that end surface portion of the holder member engaged by the cap, and mutually engaging surfaces on the body and inner face of the intermediate member which are of greater diameter than of said portions.

11. In a known needle valve structure comprising a body having a cavity therein and an inlet and an outlet connected with the cavity, a valve seat in the cavity between the inlet and the outlet and having a passage therethrough connecting the inlet and outlet, said body having an internally threaded bore leading from the cavity and coaxial with the seat passage, a valve stem coaxial with said passage and bore and having an externally threaded portion cooperable with the threads of the bore for moving the stem toward and away from the seat consequent upon rotation of the stem about its axis in opposite directions, respectively, a needle valve plug on, and rigid with, and coaxial with, the stem, said stem having an outer end portion extending outside of the body, an operating handle on the outer end of the stem for rotating the stem, said body having a counterbore coaxial with its threaded bore and disposed beyond the threaded bore in a direction away from the seat, and opening toward the outer end of the stem, the improvement comprising an annular O-ring holder having a central bore accommodating the stem for relative axial and rotary movement, an intermediate annular member having a central bore accommodating the stem for relative axial and rotary movement, said body having an external threaded portion coaxial with its counterbore, a compression cap in threaded engagement with the externally threaded portion of the body and having an end wall with a bore therein accommodating the stem for axial and rotary movement, the inner surface of said end wall engaging the adjacent end of the O-ring holder for forcing the O-ring holder toward the seat upon rotation of the cap in one direction, said holder having an inner end face portion engaging the peripheral margin of the outer end face of the intermediate member toward the seat as the holder is so moved, said intermediate member having a peripheral margin at its inner end face, said body having a surface disposed radially outwardly from the axis of the counterbore a greater distance than the radius of the counterbore, and cooperable with said margin to limit the movement of the intermediate member toward the seat when the cap is rotated so that the cap draws the body, holder, and member axially into firm engagement, an O-ring in the counterbore of the body in sealing relation between the body and inner end face of the intermediate member, said intermediate member having a channel in its outer end face opening toward the holder, an O-ring in said channel and forming a seal between the intermediate member and the O-ring holder, said O-ring holder having a counterbore disposed inwardly from the outer peripheral wall of the channel and opening toward the intermediate member, a pair of coaxial O-rings of equal diameter in juxtaposed end to end relation in the counterbore of the holder and forming a seal between the outer periphery of the stem and the peripheral wall of the counterbore of the holder, a back-up ring in the counterbore of the holder between the end wall of the counterbore and the O-ring of the counterbore adjacent thereo, the outer diameter of the outer end of the holder engaged by the cap end wall being less than the outer diameter of the peripheral margin of the intermediate member engaged by the holder and less than the outer diameter of said intermediate member peripheral margin engaged by the body.

12. In a known high pressure flow control valve structure comprising a hollow body having an inlet and an outlet, valve means movably mounted in the body for controlling the flow from the inlet to the outlet, an operating stem mounted in the body for axial movement in opposite directions, and connected to the valve means for operating the valve means in response to the axial movements of the stem, and having a portion extending outside of the body, operating means externally of the body for moving the stem axially in said opposite directions; a high pressure sealing means comprising the following: an annular O-ring holder having one end facing the cap end wall and the other end facing the body and having a central bore coaxial with the stem and accommodating the stem for axial movement relative thereto, and having a coaxial counterbore of larger diameter than said central bore and opening through said other end, a pair of axially aligned O-rings in the counterbore in end to end juxtaposition and in sealing relation to the peripheral walls of the counterbore and stem for preventing escape of fluid between the holder and stem, an annular valve washer on, and coaxial with, the stem between the holder and body and having an annular channel therein open toward the holder, an O-ring in the channel in sealing relation to wall portions of the channel and to said other end of the holder at a location outwardly from the counterbore to prevent escape of fluid radially outwardly between the holder and washer, said body having an enlarged counterbore coaxial with the stem and opening toward the washer, an O-ring in the body counterbore in sealing relation to wall portions of the body and the end of the washer facing the body to prevent escape of fluid radially outwardly between the body and said washer, and compression cap means surrounding the stem and connected to the body for adjustment axially of the stem and exerting axial pressure on the holder in a direction toward the body for compressing the O-ring between the holder and washer and the O-ring between the washer and body.

References Cited by the Examiner

UNITED STATES PATENTS 3,059,937 10/1962 Wettstein _____ 277—110
3,147,950 9/1964 Milleville _____ 251—214

WILLIAM F. O'DEA, *Primary Examiner.*

ISADOR WEIL, *Examiner.*

D. MATTHEWS, *Assistant Examiner.*